United States Patent
Bailey

(10) Patent No.: US 10,548,199 B2
(45) Date of Patent: *Jan. 28, 2020

(54) SYSTEM AND METHOD FOR INDICATING OPERATIONAL CHARACTERISTICS OF A LIGHTING SYSTEM

(71) Applicant: Hubbell Incorporated, Shelton, CT (US)

(72) Inventor: Christopher Lane Bailey, Greenville, SC (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/371,695

(22) Filed: Apr. 1, 2019

(65) Prior Publication Data

US 2019/0230754 A1 Jul. 25, 2019

Related U.S. Application Data

(63) Continuation of application No. 15/796,136, filed on Oct. 27, 2017, now Pat. No. 10,251,235.

(60) Provisional application No. 62/415,031, filed on Oct. 31, 2016.

(51) Int. Cl.
*H05B 33/08* (2006.01)
*H02H 3/04* (2006.01)

(52) U.S. Cl.
CPC ............ *H05B 33/089* (2013.01); *H02H 3/04* (2013.01)

(58) Field of Classification Search
CPC .............. H05B 33/086; H05B 33/089; H05B 33/0842; H05B 33/0815; H05B 33/0845; H05B 37/02; H05B 37/0227; A61N 5/0613; A61N 5/0624; A61N 5/06; A61N 2005/0615; A61N 2005/0642; A61N 2005/0651; A61N 2005/0653; A61N 2005/0626; A61N 2005/0662; A61L 2/084; A61L 2/0052; A61L 2202/14; A61L 2202/24; A61L 2/08; A61L 2/10; A61L 9/20; A61L 2/0047; A61L 2/24

See application file for complete search history.

(56) References Cited

U.S. PATENT DOCUMENTS

| | | |
|---|---|---|
| 8,398,264 B2 | 3/2013 | Anderson |
| 9,039,966 B2 | 5/2015 | Anderson |
| 9,839,706 B2 | 12/2017 | Anderson |

(Continued)

OTHER PUBLICATIONS

MacLean, M., "405 nm light technology for the inactivation of pathogens and its potential role for environmental disinfection and infection control", Journal of Hospital Infection, 88, 2014, pp. 1-11. (11 pages).

(Continued)

*Primary Examiner* — Haissa Philogene
(74) *Attorney, Agent, or Firm* — Michael Best & Friedrich, LLP

(57) ABSTRACT

A lighting system including a high intensity narrow spectrum light source, an indicator configured to provide an indication, and a controller. The controller is configured to compare an operating frequency of the high intensity narrow spectrum light to a predetermined operating frequency, and control the indicator based on the comparison of the operating frequency of the high intensity narrow spectrum light to the predetermined operating frequency.

20 Claims, 4 Drawing Sheets

(56) References Cited

U.S. PATENT DOCUMENTS

| | | |
|---|---|---|
| 10,136,485 B1 * | 11/2018 | Coetzee ............. H05B 33/0809 |
| 10,251,235 B2 * | 4/2019 | Bailey .................. H05B 33/089 |
| 10,363,325 B2 * | 7/2019 | Hawkins |
| 2016/0015840 A1 | 1/2016 | Gordon |
| 2017/0099828 A1 | 4/2017 | Ronning |
| 2017/0246329 A1 | 8/2017 | Lloyd |
| 2018/0117189 A1 | 5/2018 | Yadav |

OTHER PUBLICATIONS

Noimark, Sacha, "Light-activated antimicrobial surfaces with enhanced efficacy induced by a dark-activated mechanism", Chemical Science, 2014, pp. 2216-2223. (8 pages).

Wallace, John, "HINS light kills surface bacteria in hospitals", Laser Focus World, Nov. 15, 2010 (http://www.laserfocusworld.com/articles/2010/11/hins-light-kills-surface.html) (3 pages).

MacLean, M., "Environmental decontamination of a hospital isolation room using high-intensity narrow-spectrum light", Journal of Hospital Infection, 76, 2010, pp. 247-251. (5 pages).

Kenall Mfg. Launches New Bacteria-killing LED Light for Hospitals, LEDinside, Jun. 29, 2015 (http://www.ledinside.com/products/2015/6/kenall_manufacturing_launches_new_uv_led_light_for_hospitals) (3 pages).

\* cited by examiner

SYSTEM AND METHOD FOR INDICATING OPERATIONAL CHARACTERISTICS OF A LIGHTING SYSTEM

RELATED APPLICATION

The application claims priority to U.S. patent application Ser. No. 15/796,136, filed Oct. 27, 2017, which claims priority to U.S. Provisional Patent Application 62/415,031, filed Oct. 31, 2016, the entire contents both of which are hereby incorporated.

FIELD

Embodiments relate to luminaire or lighting systems.

SUMMARY

Lighting systems typically include light-emitting diodes (LEDs). High Intensity Narrow Spectrum (HINS) lighting systems include LEDs configured to output light within a wavelength of approximately 400 nm to approximately 440 nm, such as but not limited to approximately 405 nm. Such wavelength has been shown to disinfect surfaces. Accurate dosage and duration of the HINS light is necessary for effective disinfection. However, HINS light is not visible by the human eye. Therefore, it may be difficult for a user to determine when the light is operating correctly or in operation at all.

Thus, in one embodiment, the application provides a lighting system including a high intensity narrow spectrum light source, an indicator configured to provide an indication, and a controller. The controller is configured to compare an operating frequency of the high intensity narrow spectrum light to a predetermined operating frequency, and control the indicator based on the comparison of the operating frequency of the high intensity narrow spectrum light to the predetermined operating frequency.

In another embodiment the application provides a method of operating a high intensity narrow spectrum light source. The method includes comparing, via a controller, an operating frequency of the high intensity narrow spectrum light source to a predetermined operating frequency. The method further includes controlling, via the controller, an indicator based on the comparison of the operating frequency of the high intensity narrow spectrum light source to the predetermined operating frequency.

In yet another embodiment, the application provides lighting system including a high intensity narrow spectrum light source, a shade configured to selectively cover the high intensity narrow spectrum light source, and a controller. The controller is configured to compare an operating frequency of the high intensity narrow spectrum light to a predetermined operating frequency, and control the shade based on the comparison of the operating frequency of the high intensity narrow spectrum light to the predetermined operating frequency.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
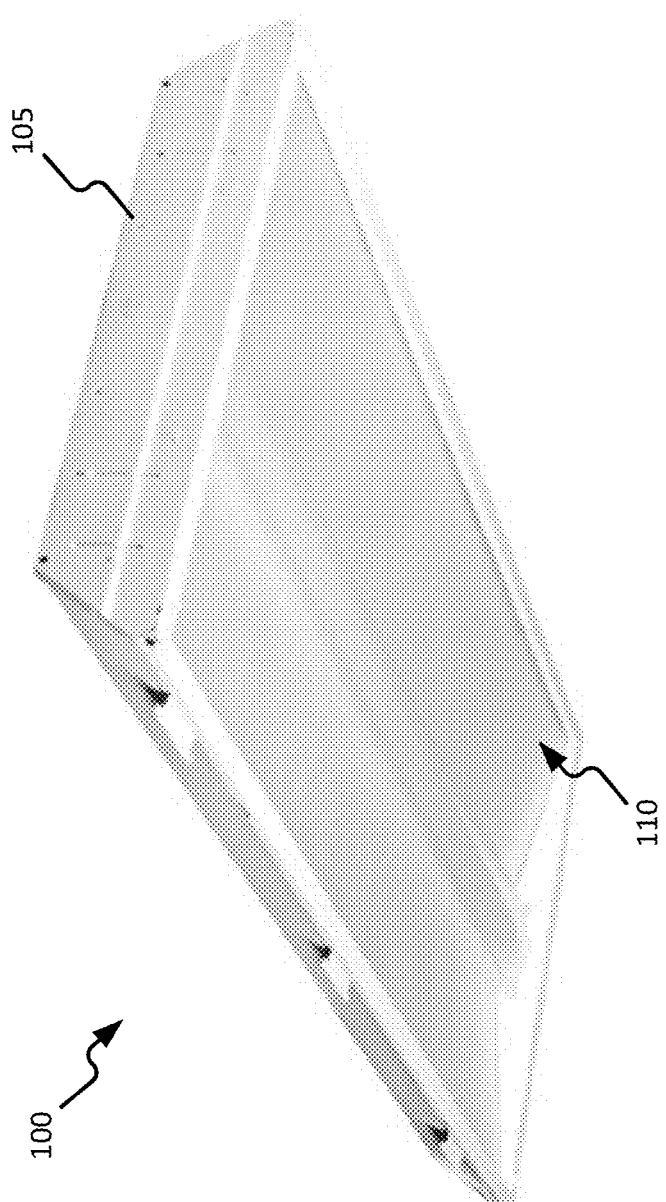
FIG. 1 illustrates a lighting system according to some embodiments of the application

FIG. 1 illustrates a lighting system 100 according to some embodiments of the application. The lighting system 100 includes a housing 105 and one or more light-emitting diodes (LEDs) 110 contained within the housing. Although illustrated as a recessed ambient lighting system, lighting system 100 may be a recessed down lighting system, a suspended direct lighting system, a suspended indirect lighting system, a track lighting system, an area lighting system, a flood lighting system, etc.

The LEDs 110 may be high intensity narrow spectrum (HINS) LEDs. In some embodiments, the HINS LEDs have an output frequency of approximately 380 nm to approximately 440 nm. In other embodiments the HINS LEDs have an output frequency of approximately 400 nm to approximately 440 nm. In such embodiments, the HINS LED may have an output frequency of approximately 405 nm.

In some embodiments, the lighting system 100 may include an optic coupled to the LEDs 110. In such an embodiment, the optic may be a diffusion optic, a prismatic optic, a reflector optic, a total internal reflection (TIR) optic, a combination optic, a light pipe or edge lit optic, etc.

Figure 2:
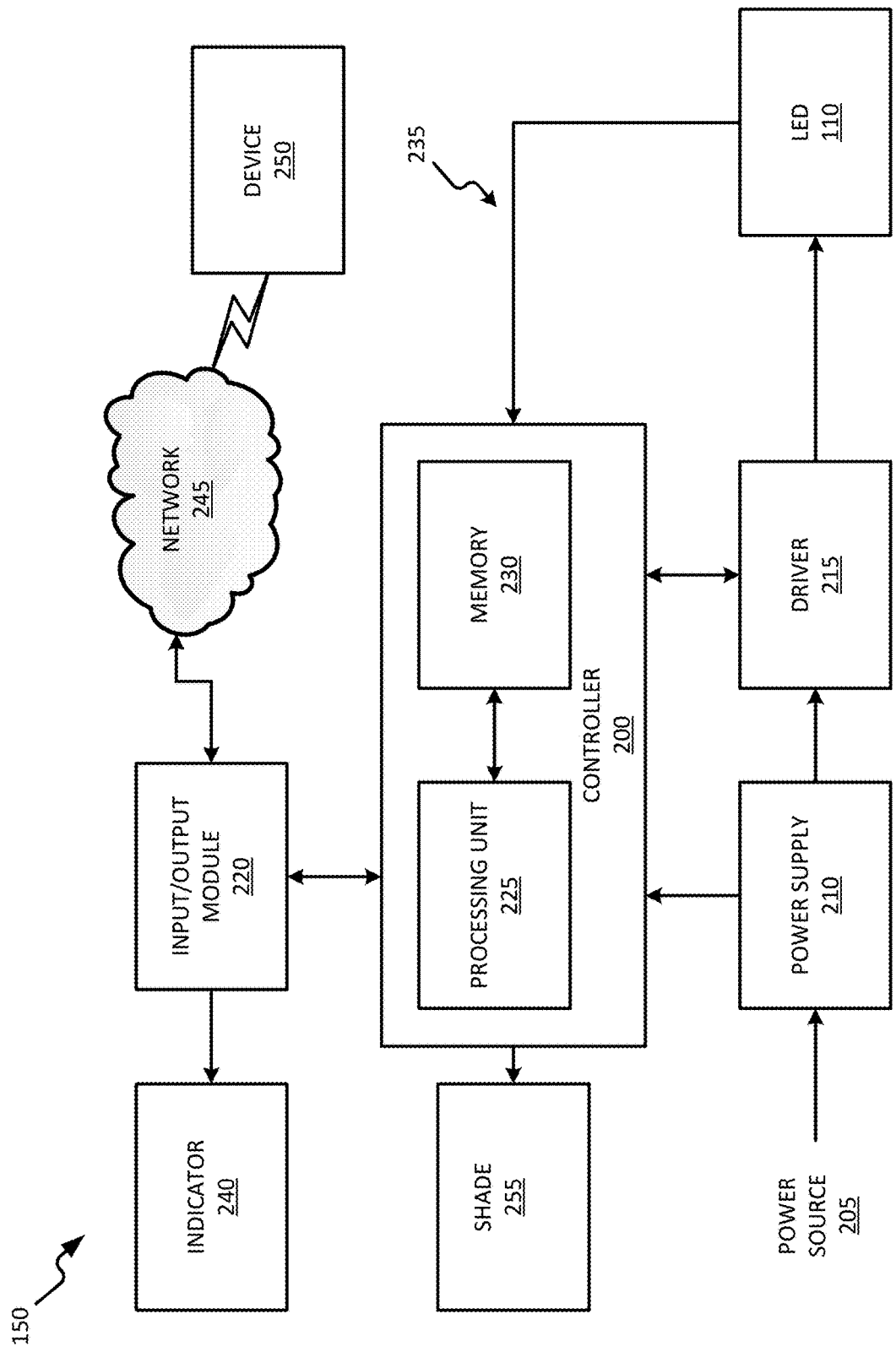
FIG. 2 illustrates a control system of the lighting system of FIG. 1 according to some embodiments of the application.

FIG. 2 illustrates a block diagram of a control system 150 of the lighting system 100 according to some embodiments of the application. As illustrated, the control system 150 includes a controller 200 electrically and/or communicatively coupled to a power source 205 (via power supply 210), a driver 215, and an input/output module 220. The controller 200 includes a plurality of electrical and electronic components that provide power, operational control, and protection to the components and modules within the controller 200 and/or the lighting system 100. For example, the controller 200 includes, among other things, a processing unit 225 (e.g., a microprocessor, a microcontroller, or another suitable programmable device) and a memory 230. In some embodiments, the controller 200 is implemented partially or entirely on a printed circuit board or a semiconductor (e.g., a field-programmable gate array ["FPGA"] semiconductor) chip, such as a chip developed through a register transfer level ("RTL") design process.

The power supply 205 supplies a nominal power to the controller 200. In some embodiments, the power supply 205 receives an alternating-current (AC) power from the power source 205 and converts the AC power into a nominal direct-current (DC) power. The power source 205 may supply an AC power having approximately 100V to approximately 120V at a frequency of approximately 50 Hz to approximately 60 Hz. In other embodiments, the power source 205 supplies an AC power having approximately 200V to approximately 240V at a frequency of approximately 50 Hz to approximately 60 Hz. In other embodiments, the power supply 210 includes a battery, or other power storage device.

The driver 215 receives power from the power supply 210 and provides an output drive signal, typically a constant current at a specific voltage, to the LEDs 110. In other embodiments, the driver 215 may receive power directly from power source 205. In some embodiments, the driver 215 receives a control signal from the controller 200. In such an embodiment, the driver 215 may vary the output drive signal based on the control signal.

The control system 150 further includes a feedback loop 235. The feedback loop 235 is configured to provide the controller 200 with operational characteristics of the LEDs 110. For example, in some embodiments, the feedback loop 235 provides information related to whether the LEDs 110 are currently operating and the current operating frequency of the LEDs 110. The controller 200 may record the operational characteristics of the LEDs in the memory 230 in order to determine further characteristics of the LEDs 110, for example but not limited to, the duration of time the LEDs 110 have operated since initial installation and the duration of time the LEDs 110 have operated since last replacement. Such additional characteristics may be used to determine when replacement of LEDs in the lighting system 100 are required. Although illustrated as being between LED 110 and the controller 200, in other embodiments, the feedback loop 235 may be between the driver 215 and controller 200.

The input/output module 220 provides communication links between controller 200 and various components, such as but not limited to, an indicator 240 and a network 245. In some embodiments, the communication links provided by the input/output module 220 are wireless communication links, while in other embodiments, the communication links are wired communication links. The indicator 240 is configured to provide an indication to a user. In some embodiments, the indication is based on the operational characteristics of the LEDs 110. The indicator 240 may provide a visual indication (for example, via a light, such as but not limited to an LED) and/or an audio indication (for example, via a speaker). In some embodiments, the indicator 240 may be located in the housing 105. As discussed in more details below, the indicator 240 may be located remotely from the housing 105.

The network 245 may be, for example, a wide area network (WAN), a local area network (LAN), or a personal area network (PAN). Network 245 is configured to provide a second communication link between the control system 150 and one or more outside devices 250. The outside device 250 may be, but is not limited to, a smart phone, a tablet, a laptop, a server, and a computer. Using the second communication link, the outside device 250 may be configured to receive the operational characteristics of the LEDs 110 from the control system 150. Such operational characteristics may then be stored by the outside device 250. In some embodiments, the outside device 250 may be part of a system of outside devices, such as a building management system (BMS). In some embodiments, the outside device 250 may be configured to alert a user when a particular lighting system 100, in a group of lighting systems, is in need of LED replacement.

As discussed above, the controller 200, via the feedback loop 235, may monitor and/or filter the operating frequency of the LEDs 110. In some embodiments, the controller 200 compares the operating frequency of the LEDs 110 to a predetermined operating frequency threshold (for example, approximately 400 nm, 405 nm, etc.). When the operating frequency of the LEDs 110 crosses (for example, is above or below) the predetermined threshold, the controller 200 may control, via the driver 215, the LEDs 110 to maintain the operating frequency of the LEDs 110 to the predetermined threshold. Additionally, when the operating frequency of the LEDs 110 crosses (for example, is above or below) the predetermined threshold, the controller 200 may disconnect power to the LEDs 110. Furthermore, when the operating frequency of the LEDs 110 crosses (for example, is above or below) the predetermined threshold, the controller 200 may provide an indication to the user via the input/output module 220, indicator 240, and/or network 245. In some embodiments, the lighting system 100 may further include a mechanical shade. In such an embodiment, the controller 200 may be configured to control the mechanical shade to selectively cover the LEDs 110 when the operating frequency of the LEDs 110 crosses (for example, is above or below) a predetermined frequency (for example, approximately 400 nm, 405 nm, etc.). In some embodiments, the mechanical shade may be a lens, or filter, configured to block light above or below a predetermined frequency (for example, approximately 400 nm, 405 nm, etc.).

Figure 3:
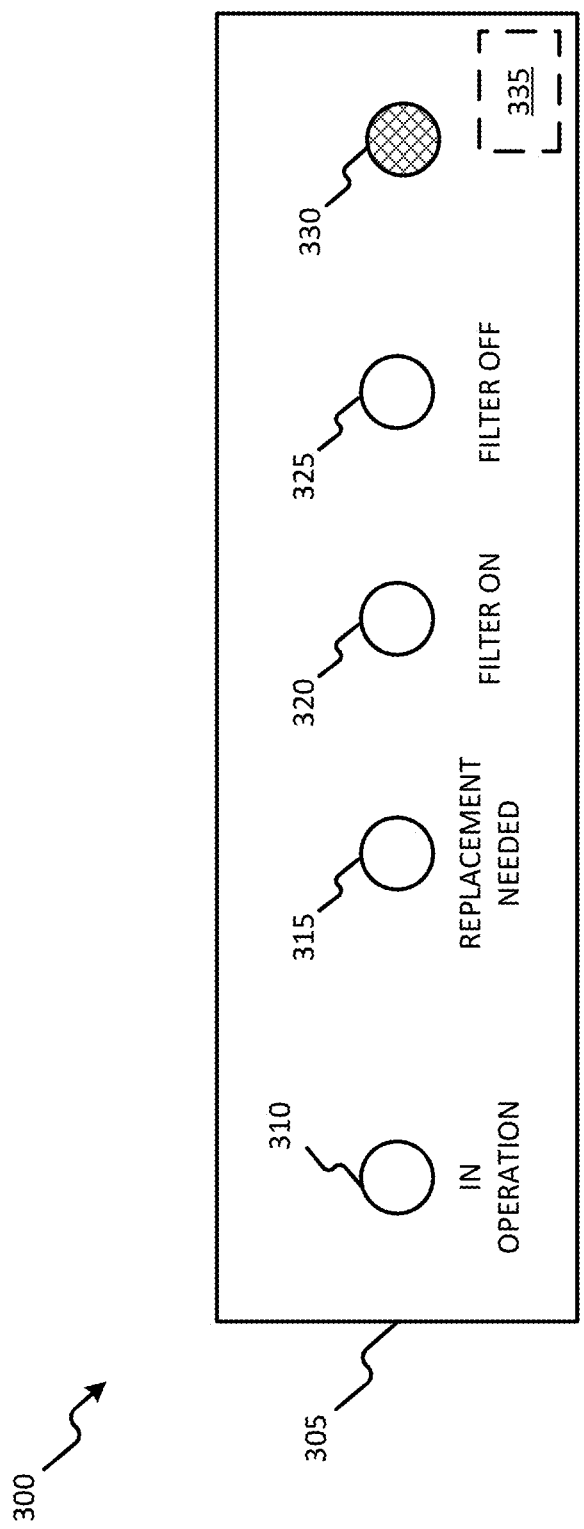
FIG. 3 illustrates an indicator of the lighting system of FIG. 1 according to some embodiments of the application.

FIG. 3 illustrates an indicator 300 according to some embodiments of the application. In such an embodiment, the indicator 300 is located remotely from the housing 105, for example but not limited to, in the same room of a building as the housing 105 or in another room of the building.

As illustrated in FIG. 3, in some embodiments, the indicator 300 includes a housing 305 having an IN OPERATION light 310, a REPLACEMENT NEEDED light 315, a FILTER ON 320, a FILTER OFF 325, a speaker 330, and a communications module 335. The IN OPERATION light 310 is configured to illuminate when LEDs 110 are currently in operation. The REPLACEMENT NEEDED light 315 is configured to illuminate when LEDs 110 are in need of replacement. The FILTER ON 320 is configured to illuminate when the controller 205 is monitoring the LEDs 110, via the feedback loop 235, to prevent the LEDs 110 from crossing the predetermined operating frequency threshold. The FILTER OFF 325 is configured to illuminate when the controller 205 is not monitoring the LEDs 110, via the feedback loop 235, to prevent the LEDs 110 from crossing the predetermined operating frequency threshold.

The speaker 330 may be used in alternatively or in addition to the lights 310, 315, 320, and 325, to indicate various operational characteristics of the LEDs 110. In some embodiments, lights 310, 315, 320, and 325 are LEDs operating at a frequency visual to the user. In some embodiments, the lights 310, 315, 320, and 325, may be similar colors. In some embodiments, the lights 310, 315, 320, and 325, may be different colors.

The communications module 335 is configured to provide communications between the indicator 300 and the control system 150 (via the input/output module 220). In some embodiments, the communications module 335 is a wireless communications module using a wireless communications protocol, such as but not limited to, Bluetooth, Wi-Fi, and ZigBee. In other embodiments, the communications module 335 is a wired communications module.

Figure 4:
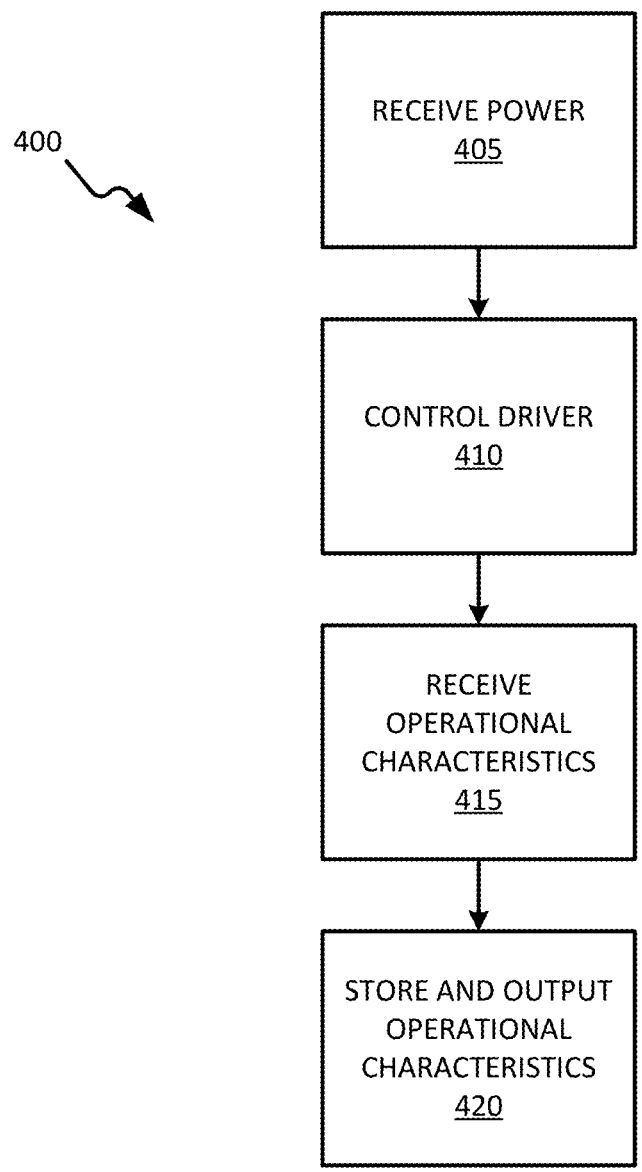
FIG. 4 illustrates an operation of the lighting system of FIG. 1 according to some embodiments of the application.

FIG. 4 illustrates an operation, or process, 400 for the lighting system 100. It should be understood that the order of the steps disclosed in process 400 could vary. Furthermore, additional steps may be added to the sequence and not all of the steps may be required. The light system 100 receives power from the power source 205 (block 405). The controller 200 controls the driver 215 to output the drive signal to the LEDs 110 (block 410). The controller 200 receives operational characteristics of the LEDs 110 via the feedback loop 235 (block 415). The controller 200 stores and outputs the operational characteristics of the LEDs 110 via the input/output module 220 (block 420). As discussed above, the operational characteristics of the LEDs 110 may be output to the indicator 240, 300, one or more devices 250 (via network 245), or both.

Thus, the invention provides, among other things, a system and method for providing a visual, audible, and/or electronic data notifications to communicate operational characteristics of a lighting system. Various features and advantages of the invention are set forth in the following claims.

What is claimed is:

1. A lighting system comprising:
a high intensity narrow spectrum light source;
an indicator configured to provide an indication; and
a controller configured to
compare an operating frequency of the high intensity narrow spectrum light to a predetermined operating frequency, and
control the indicator based on the comparison of the operating frequency of the high intensity narrow spectrum light to the predetermined operating frequency.

2. The lighting system of claim 1, wherein the indicator provides a visual indication.

3. The lighting system of claim 1, wherein the indicator provide an audio indication.

4. The lighting system of claim 1, wherein the indicator is located remotely from the high intensity narrow spectrum light.

5. The lighting system of claim 1, wherein the controller is further configured to output operational data based on an operation of the high intensity narrow spectrum light.

6. The lighting system of claim 1, wherein the controller is further configured to determine a duration of operation of the high intensity narrow spectrum light.

7. The lighting system of claim 1, further comprising a driver configured to provide power to the high intensity narrow spectrum light source.

8. The lighting system of claim 1, further comprising a shade configured to selectively cover the high intensity narrow spectrum light source.

9. The lighting system of claim 8, wherein the controller is further configured to control the shade to cover the high intensity narrow spectrum light when the operating frequency of the high intensity narrow spectrum light crosses the predetermined operating frequency.

10. A method of operating a high intensity narrow spectrum light source, the method comprising:
comparing, via a controller, an operating frequency of the high intensity narrow spectrum light source to a predetermined operating frequency; and
controlling, via the controller, an indicator based on the comparison of the operating frequency of the high intensity narrow spectrum light source to the predetermined operating frequency.

11. The method of claim 10, wherein the indicator provides a visual indication.

12. The method of claim 10, wherein the indicator provide an audio indication.

13. The method of claim 10, wherein the indicator is located remotely from the high intensity narrow spectrum light.

14. The method of claim 10, further comprising outputting operational data based on the operation of the high intensity narrow spectrum light.

15. The method of claim 10, further comprising determining a duration of operation of the high intensity narrow spectrum light.

16. The method of claim 10, further comprising determining a frequency of the high intensity narrow spectrum light.

17. The method of claim 10, further comprising prohibiting power to the high intensity narrow spectrum light when the operating frequency crosses the predetermined operating frequency.

18. The method of claim 10, wherein the predetermined operating frequency is approximately 405 nm.

19. A lighting system comprising:
a high intensity narrow spectrum light source;
a shade configured to selectively cover the high intensity narrow spectrum light source; and
a controller configured to
compare an operating frequency of the high intensity narrow spectrum light to a predetermined operating frequency, and
control the shade based on the comparison of the operating frequency of the high intensity narrow spectrum light to the predetermined operating frequency.

20. The lighting system of claim 19, wherein the shade covers the high intensity narrow spectrum light source when the operating frequency of the high intensity narrow spectrum light crosses the predetermined operating frequency.

\* \* \* \* \*